United States Patent [19]
Ott et al.

[11] 3,719,865
[45] March 6, 1973

[54] BRUSHLESS DIRECT-CURRENT MOTOR INCLUDING MECHANICALLY ADJUSTABLE GALVANOMAGNETIC MEMBERS

[75] Inventors: Hanns Ott; Jurgen Wenk, both of Nurnberg; Hans-Peter Latussek, Feucht, all of Germany

[73] Assignee: Siemens Aktiengsellschaft, Berlin, Germany

[22] Filed: Feb. 18, 1971

[21] Appl. No.: 116,571

[30] Foreign Application Priority Data

Feb. 18, 1970 Germany.................P 20 07 254.2

[52] U.S. Cl. .................318/254, 310/241, 318/542
[51] Int. Cl. .................................................H02k 29/00
[58] Field of Search..310/241, DIG. 3; 318/138, 439, 318/254, 696, 685, 541, 542

[56] References Cited

UNITED STATES PATENTS

| 3,375,422 | 3/1968 | Boudigues | 318/254 X |
|---|---|---|---|
| 3,483,456 | 12/1969 | Brunner et al. | 318/254 X |
| 3,422,334 | 1/1969 | Jastrzembski | 318/541 X |
| 2,737,605 | 3/1956 | Wagner et al. | 318/541 |
| 2,517,881 | 8/1950 | Jaggi et al. | 318/541 X |
| 2,830,247 | 4/1958 | Thomas | 318/254 |

FOREIGN PATENTS OR APPLICATIONS 612,016  11/1948  Great Britain...............318/439

Primary Examiner—G. R. Simmons
Attorney—Curt M. Avery, Arthur E. Wilfond, Herbert L. Lerner and Daniel J. Tick

[57] ABSTRACT

A brushless direct-current motor has a stator having a stator winding, a rotor, a control magnet rotatable in synchronism with the rotor and a plurality of galvanomagnetic members mounted in proximity with the control magnet. Also provided is an adjustment device for displacing the galvanomagnetic members in coaxial relation to the control magnet through an angle corresponding to at least twice the pole pitch of the rotor.

8 Claims, 6 Drawing Figures

BRUSHLESS DIRECT-CURRENT MOTOR INCLUDING MECHANICALLY ADJUSTABLE GALVANOMAGNETIC MEMBERS

Our invention relates to a brushless direct-current motor having a stator winding that is connectible to a source of direct current voltage via a controllable semiconductor means. The semiconductor means are controlled by galvanomagnetic members sensitive to a magnetic field; these members are excited by a control magnet rotating in synchronism with the rotor of the motor.

In such direct current-motors it is known to arrange magnetic field sensitive members in the stator wherewith a proper spatial angle arrangement of these members with reference to the individual winding phases of the stator winding is established at the outset. In this connection, reference may be had to U.S. Pat. No. 3,483,456 which shows the galvanomagnetic members to be located in nitches of the stator of a brushless direct-current motor. The galvanomagnetic members can be galvanomagnetic resistors (field plates) such as known from U.S. Pat. No. 3,200,316. In the present application, the galvanomagnetic members will be exemplified by Hall plates.

On the basis of the above-mentioned established spatial arrangement of the galvanomagnetic members, the poles of like polarity of the rotor and the control magnet must be axially aligned with respect to each other. This alignment, however, requires a considerable technical effort. This effort, however, is increased if, as is often the case, a polarized ring magnet is used as a control magnet, the poles of which are spatially not recognizable. In addition, with an increasing number of poles of the direct-current motor, the spatial angle between the galvanomagnetic members which are electrically displaced 90° becomes correspondingly smaller, so that in a multipoled direct-current motor, special difficulties are encountered when arranging the galvanomagnetic members with the required precision on the stator.

Accordingly, it is an object of our invention to provide a brushless direct-current motor of the above-mentioned type wherewith the proper spatial arrangement between rotor and control magnet as well as between the galvanomagnetic members and the stator winding phases is obtained in a simple manner. Subsidiary to this object, it is an object of our invention to provide such a motor wherein the galvanomagnetic members can be arranged with the required precision.

It is another object of our invention to provide a brushless direct-current motor wherewith, during assembly of the motor, no consideration need be taken with respect to the mutual angle arrangement between rotor, control magnet and the individual winding phases of the stator winding.

According to a feature of our invention, a plurality of galvanomagnetic members are mounted in proximity of a control magnet rotatable in synchronism with the rotor. Also provided is an adjusting device for displacing the galvanomagnetic members in coaxial relation to the control magnet through an angle corresponding to at least twice the pole pitch of the rotor.

According to a further feature of our invention, obtaining the displaced arrangement of the galvanomagnetic members is facilitated when at least one of the galvanomagnetic members is arranged on a carrier disc such as to be adjustable in a substantially circular path in the counterclockwise and clockwise directions by an amount at least equal to 90 electrical degrees.

In order to balance out differences in the sensitivity of the galvanomagnetic members, it is efficacious to arrange at least one galvanomagnetic member on the carrier disc so as to be adjustable in radial direction. The galvanomagnetic members can be displaced in a simple manner in a substantially circular direction if they are arranged at the mid-portion of respective brackets these brackets having end portions detachably secured in guide slots or openings of the carrier disc.

A reliable connection of the galvanomagnetic members with the semiconductors provided for control purposes is achieved according to further feature of the invention when insertion contacts are provided on the carrier disc connected to connecting leads for the galvanomagnetic members. A still further feature of the invention provides that the insertion contacts are configured so as to constitute a portion of a conductor plate. In this way, only a small space for the insertion contact is required. In addition, a shortening of the motor housing is made possible by equipping the carrier disc with a bearing for the rotor.

The invention will now be described with reference to the drawings wherein.

Figure 1:
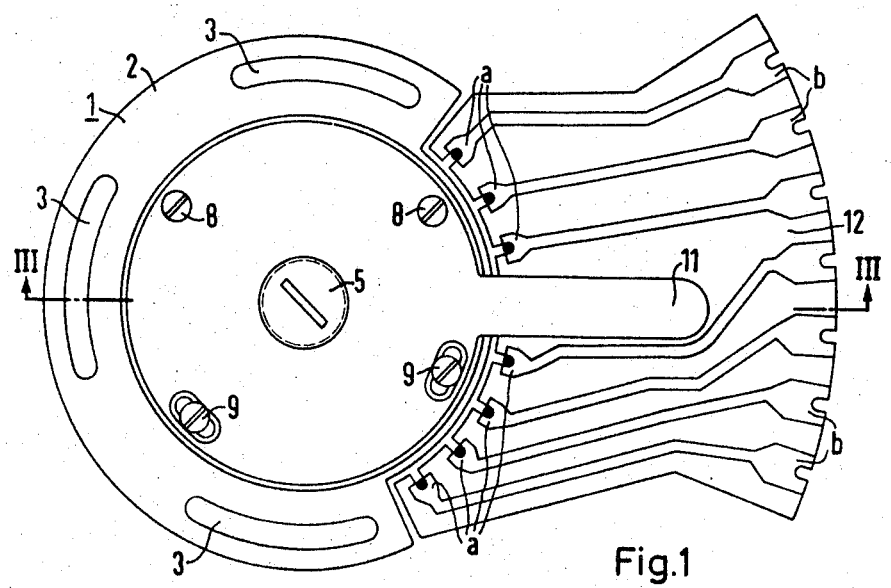
FIG. 1 is a plan view of a side of a control head or carrier disc structure for a multipole brushless direct-current motor, this side being the side facing away from the motor housing.
Figure 2:
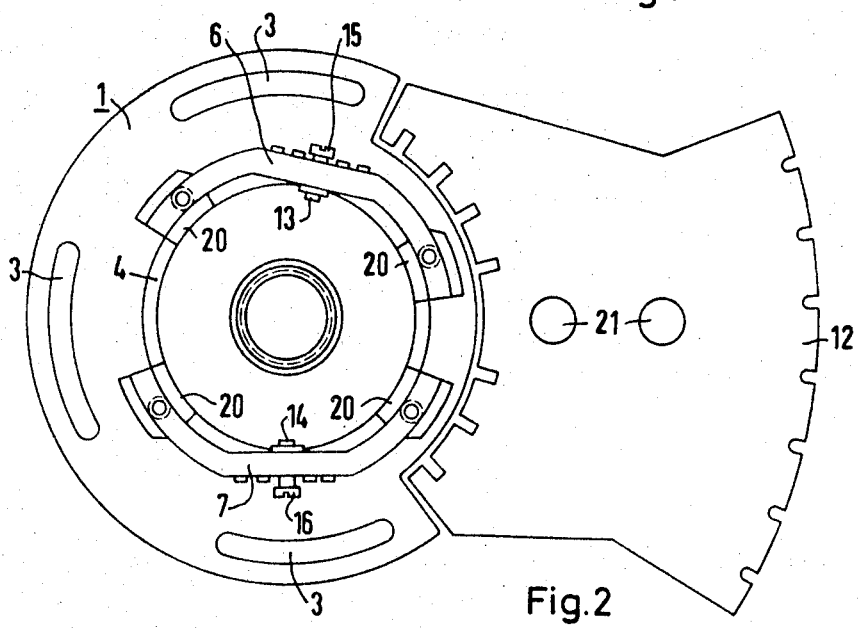
FIG. 2 is a plan view of the side of the control head according to FIG. 1, this side being the side facing the motor housing.
Figure 3:
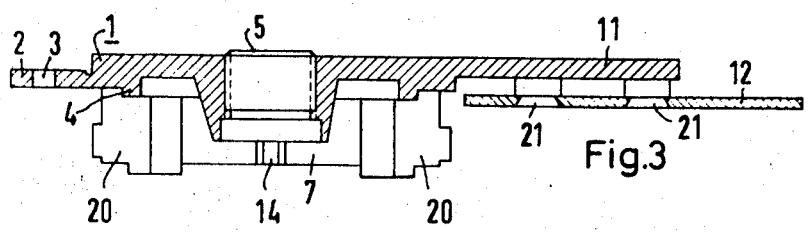
FIG. 3 is a view, partially in section, of the control head of FIG. 1 taken along the line III—III.

Referring to FIG. 1, reference numeral 1 designates a circularly shaped carrier disc having a flange edge 2 which extends over approximately two-thirds of the disc periphery. Three curved openings 3 are provided in the edge portion 2. The openings extend at least over a spatial angle corresponding to twice the pole pitch. On the side of the disc facing the motor housing, the carrier disc has a centering ridge 4. In addition, a pivot bearing screw 5 is threadably connected. Two brackets 6 and 7 each having linear mid-portions are detachably secured to the carrier disc 1 by means of screws 8 and 9. The screw 8 extends through two circular holes and screw 9 extends through two curved guide slots in the carrier disc. The Hall generator 13 and 14 are adjustable in radial direction by means of adjusting screws 15 and 16, respectively.

In the middle of the opening defined by the flange edge 2 there is located a narrow lug 11 on which is secured a conductor plate 12. The conducting paths of the conductor plate are connected at location a with connecting leads from two Hall generators 13 and 14 arranged in the mid-portion of respective brackets 6 and 7. At location b the contact paths are configured as insertion contacts which can be connected via a corresponding connecting means with a control circuit.

Figure 4:
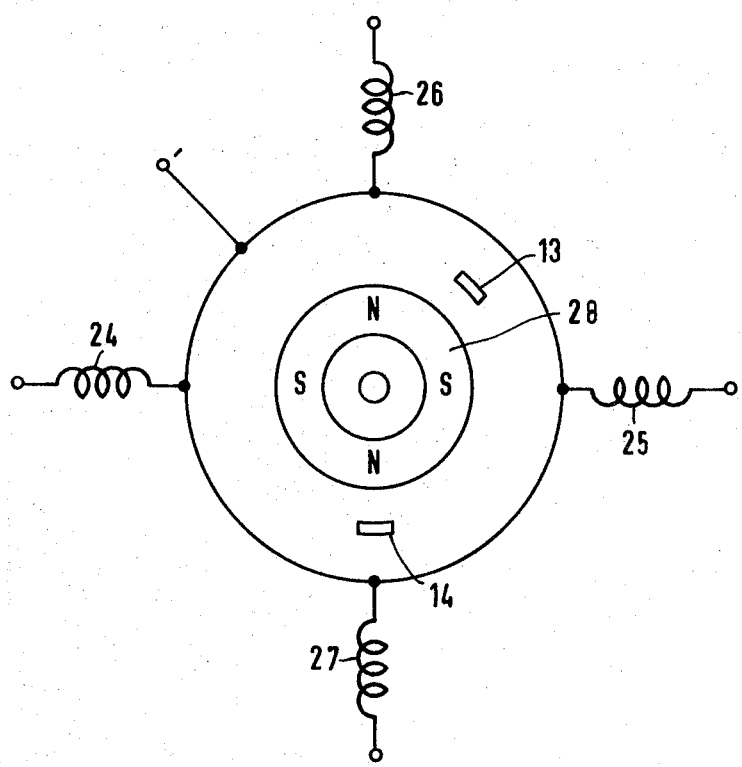
FIG. 4 is a schematic representation illustrating the galvanomagnetic members positioned with respect to the stator windings and the control magnetic provided for exciting these members.
Figure 6:
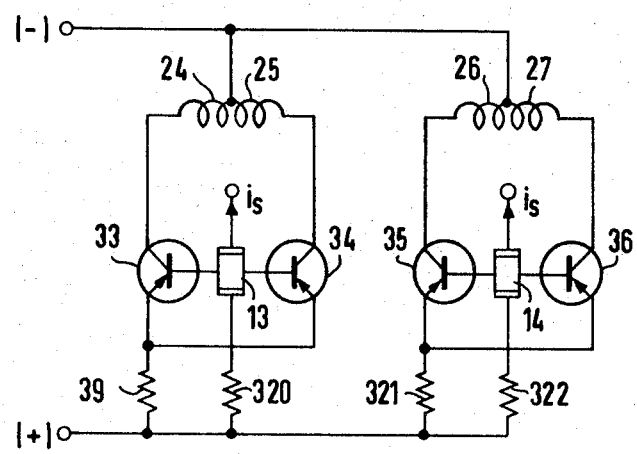
FIG. 6 is a schematic diagram of a brushless direct-current motor, with semiconductor control means exemplified by a circuit arrangement having four transistors of the pnp type.

A suitable control circuit for the brushless direct-current motor of the invention is illustrated in FIG. 6. Referring to FIG. 6, transistors 33, 34 and 35, 36 are electrically connected with the respective stator winding pairs 24, 25 and 26, 27. The transistors in this embodiment are all of PNP type. Each of the winding pairs 24, 25 and 26, 27 has a mid-tap, thus forming two portions, as shown schematically in FIG. 4. The two winding pairs 24, 25 and 26, 27 are angularly displaced 90° from each other. The circuit connections shown in FIG. 6 further comprise four resistors 39, 320, 321, 322. The emitters of all four transistors are connected through the resistors 39 and 321 to the positive pole of the direct-voltage source, here represented by a positive bus and terminal. The one current terminal of each Hall generator that is positive relative to the potential of the Hall-voltage electrodes is connected to the same positive pole of the direct-voltage supply in series with the resistor 320 or 322. The mid-points of the stator winding pairs 24, 25 and 26, 27 are both connected to the negative pole of the direct-voltage source, this being represented by a common negative bus and negative terminal.

For additional details with reference to the foregoing circuit configuration reference may be had to U.S. Pat. No. 3,483,456.

Since the Hall generators are connected on an adjustable control head instead of on the stator as is the case in conventional brushless direct-current motors, no attention must be given during the assembly of the direct-current motor to the angle arrangements made between the rotor control magnet and the individual winding phases of the stator winding.

The proper angle arrangement by the rotor control magnet and winding phases is obtained by a subsequent adjustment of the control head. Since the control head or carrier disc structure is adjustable with respect to the control magnet over an angle corresponding to at least twice the pole pitch, the desired direction of rotation can be established in each instance. In addition, it is possible by means of an appropriate adjustment of the control head to drive the motor in the opposite direction.

Mounting the Hall generators 13 and 14 on the brackets 6 and 7 connected to the carrier disc 1 is substantially facilitated because of the improved accessibility as compared with mounting the Hall generators on the stator proper. Thus, the construction according to the invention can be carried out with greater precision. The precision is still further increased by the adjustability of the bracket 6. By means of the adjustable screws 15 and 16, the Hall generators can in a simple manner be adjusted in the radial direction thereby balancing out their Hall voltages. In addition, it is possible to increase or decrease the Hall voltages within specific limits.

The connecting leads of the Hall generators are connected to contact paths disposed on a conductor plate 12 so that between the Hall generators 13 and 14 and the connection location a there will be no changes in position apart from the spatially insignificant adjusting path when adjusting the position of the bracket 6. In this way, no special requirements are imposed upon the connecting leads of the Hall generators.

Figure 5:
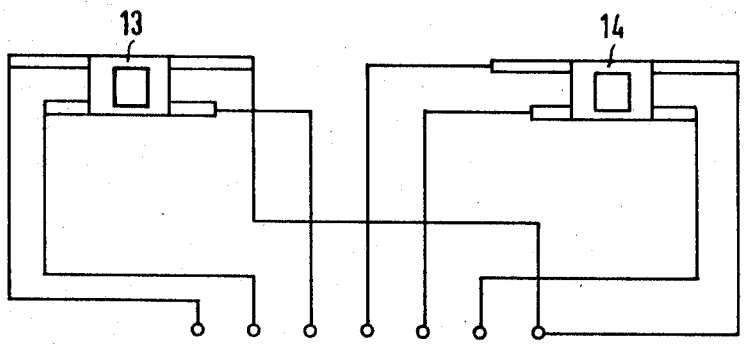
FIG. 5 is an electrical schematic diagram illustrating the electrical connection of the galvanomagnetic members to terminal contacts.

FIG. 5 illustrates schematically the Hall generators 13 and 14 equipped with appropriate connecting leads. Carrier disc 1 of the control head or carrier disc structure can also be configured in advantageous manner to receive a bearing 5 for the rotor of the motor. For this purpose, the carrier disc must be strengthened at its mid-portion similar to that of a bearing plate so as to permit the addition of a corresponding bearing bore. In this embodiment, the bearing bore can receive a pivot bearing screw 5 on whose location a radial bearing can also be placed if the motor construction should require this construction.

While the invention has been described by means of specific examples and in a specific embodiment, we do not wish to be limited thereto for obvious modifications will occur to those skilled in the art without departing from the spirit and scope of the invention.

We claim:

1. A brushless direct-current motor comprising a stator having a stator winding, a rotor, a control magnet rotatable in synchronism with said rotor, a carrier disc, a plurality of galvanomagnetic members mounted on said carrier disc in proximity with said control magnet, said carrier disc being rotatably mounted adjacent said control magnet for displacing said galvanomagnetic members in coaxial relation to said control magnet through an angle corresponding to at least twice the pole pitch of said rotor, semiconductor control means, said stator winding being connectable via said control means to a source of direct-current voltage, said galvanomagnetic members being connected to said control means for controlling the latter in dependence upon the magnetic field of said control magnet, and said carrier disc including displacing means for displacing at least one of said galvanomagnetic members at least 90 electrical degrees in clockwise and counter-clockwise directions from its initial position and for radially displacing at least one of said galvanomagnetic members.

2. In a brushless direct current motor according to claim 1, said means for radially displacing said one galvanomagnetic member comprising a screw engaging said displacing means.

3. In a brushless direct-current motor according to claim 1, comprising positioning means arranged on said disc for displacing the latter through said angle.

4. A brushless direct-current motor according to claim 1, wherein said carrier disc has a plurality of guide openings, said motor comprising a plurality of brackets, each of said brackets having end portions being detachably secured at corresponding ones of said guide openings, said galvanomagnetic members being mounted on the mid-portion of said brackets respectively.

5. A brushless direct-current motor according to claim 1, said motor comprising insertion contact means, connection means for electrically joining the said galvanomagnetic members with said contact means.

6. In a brushless direct-current motor according to claim 5, said connections means comprising a conductor plate, and said contact means being part of said plate.

7. A brushless direct-current motor according to claim 1, said carrier disc having a bearing member for journalling said rotor.

8. A brushless direct-current motor according to claim 1 wherein said stator includes a stator structure for housing said motor, said stator structure having a bore, said carrier disc having a centering ridge for extending into said bore.

* * * * *